United States Patent [19]

Ricken

[11] Patent Number: 4,972,724

[45] Date of Patent: Nov. 27, 1990

[54] CORIOLIS-TYPE MASS FLOWMETER HAVING A STRAIGHT MEASURING TUBE

[75] Inventor: Hans M. Ricken, Goettingen, Fed. Rep. of Germany

[73] Assignee: Fischer & Porter Company, Warminster, Pa.

[21] Appl. No.: 428,303

[22] Filed: Oct. 26, 1989

[30] Foreign Application Priority Data

Jul. 15, 1988 [DE] Fed. Rep. of Germany ....... 3824111

[51] Int. Cl.$^5$ .............................................. G01F 1/84
[52] U.S. Cl. ................................................ 73/861.37
[58] Field of Search ......................... 73/861.37, 861.38

[56] References Cited

U.S. PATENT DOCUMENTS

| | | | |
|---|---|---|---|
| 3,329,019 | 7/1967 | Sipin | 73/861.37 |
| 4,622,858 | 11/1986 | Mizerak | 73/861.38 |
| 4,879,910 | 11/1989 | Lew | 73/861.37 |

FOREIGN PATENT DOCUMENTS 0119638  9/1984  European Pat. Off. .

*Primary Examiner*—Herbert Goldstein
*Attorney, Agent, or Firm*—Michael Ebert

[57] ABSTRACT

A flowmeter of the Coriolis type in which the fluid to be metered is conducted through a straight measuring tube attached at its inlet and outlet ends to fixed supports, whereby the tube is free to vibrate in a circular path as well as to torsionally oscillate. Actuator means are provided to excite the tube at a point intermediate the inlet and outlet ends, causing the tube to vibrate in a circular path. When fluid flows therethrough, the tube is subjected to Coriolis forces, causing it to torsionally oscillate in accordance with mass flow. A pair of sensors are disposed at respective points between the inlet and outlet ends of the tube and the excitation point to yield in response to the torsional oscillations, sensor signals which are applied to a processing circuit from which a measurement signal is derived that depends on the relative phases of the sensor signals, after averaging several circular vibrations to provide a mass flow readout.

7 Claims, 1 Drawing Sheet

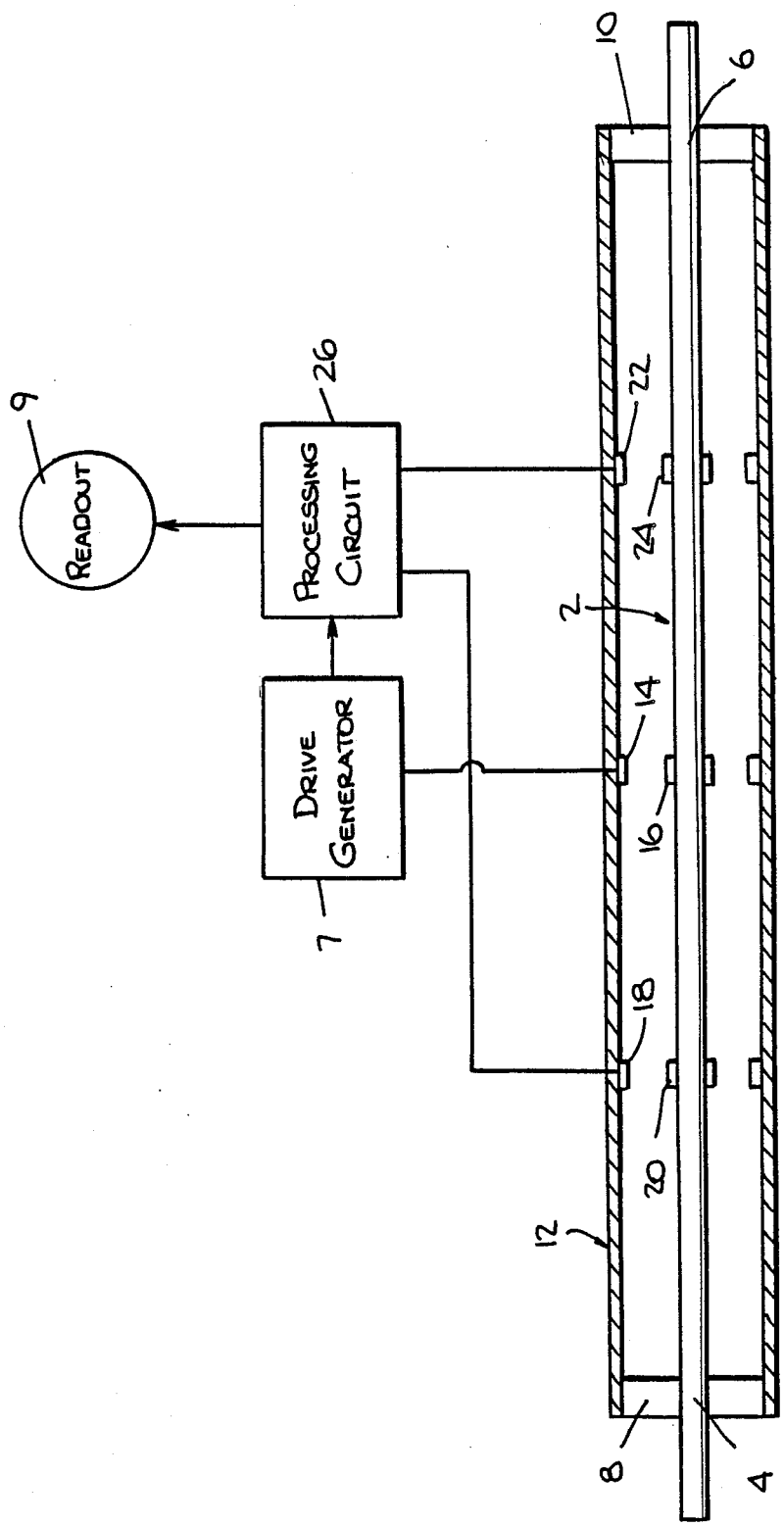

CORIOLIS-TYPE MASS FLOWMETER HAVING A STRAIGHT MEASURING TUBE

BACKGROUND OF INVENTION

1. Field of Invention

This invention relates generally to mass flowmeters, and more particularly to a Coriolis-type meter in which the fluid to be metered is conducted through a straight flow tube which is excited to vibrate in a circular path.

2. Status of Prior Art

A mass flowmeter is an instrument for measuring the mass of a fluid flowing through a conduit per unit time. Most meters for this purpose measure a quantity from which the mass can be inferred, rather than measuring mass directly. Thus, one can measure the mass flow with a volumetric flowmeter by also taking into account pressure, temperature and other parameters to compute the mass.

A Coriolis-type mass flowmeter provides an output directly proportional to mass flow, thereby obviating the need to measure pressure, temperature, density and other parameters. In this type of meter, there are no obstacles in the path of the flowing fluid, and the accuracy of the instrument is unaffected by erosion, corrosion or scale build-up in the flow sensor.

In the Roth U.S. Pat. No. 3,132,512, a Coriolis-type mass flowmeter is disclosed in which a flow loop vibrating at its resonance frequency is caused to oscillate about a torque axis which varies with fluid flow in the loop. This torsional oscillation is sensed by moving coil transducers.

The Cox et al. U.S. Pat. No. 4,127,828 and U.S. Pat. No. 4,192,184 show a Coriolis-type meter having two U-shaped flow loops arranged to vibrate like the tines of a tuning fork, the torsional oscillation of these loops being sensed by light detectors to determine the mass flow. In the Smith U.S. Pat. No. 4,222,338, electromagnetic sensors provide a linear analog signal representing the oscillatory motion of a U-shaped pipe. Electromagnetic sensors are also used in the Smith et al. U.S. Pat. No. 4,492,025, in which the fluid whose mass is to be measured flows serially through two parallel U-shaped pipes.

The present invention provides a Coriolis-type mass flowmeter using a straight measuring tube. Of greatest prior art interest in this regard is the patent to Sipin, 3,329,019, which also discloses a straight measuring tube. In Sipin, this tube is electromagnetically excited to vibrate up and down, and because the tube is at the same time subjected to Coriolis forces, the vibrating tube oscillates torsionally. Strain gauge sensors are provided adjacent the inlet and outlet ends of the tube to sense the torsional oscillations.

The advantage of the straight tube arrangement of Sipin over measuring tubes disclosed in prior art Coriolis-type mass flowmeters is that the latter flowmeters employ U-shaped or otherwise curved flow tubes which somewhat impede flow, whereas a straight flow tube offers minimal resistance to flow and therefore exhibits the lowest possible pressure drop.

The drawback to the Sipin arrangement is that the measuring tube which is excited to vibrate up and down is sensitive to disturbances from external sources which act to impart vibratory motion to the flow tube, and these disturbances adversely affect the accuracy of the meter.

SUMMARY OF INVENTION

In view of the foregoing, the main object of the invention is to provide a Coriolis-type mass flowmeter which makes use of a straight measuring tube, the meter having a relatively low pressure drop and being substantially insensitive to external disturbances.

A significant feature of the invention is that the flowmeter is capable of functioning in an environment which subjects the meter to vibratory forces of external origin, yet the meter continues to afford accurate mass flow readings.

Also an object of the invention is to provide a Coriolis-type meter of exceptionally simple design and which can be manufactured at relatively low cost.

Briefly stated, these objects are attained in a flowmeter of the Coriolis type in which the fluid to be metered is conducted through a straight measuring tube attached at its inlet and outlet ends to fixed supports, whereby the tube is free to vibrate in a circular path as well as to torsionally oscillate. Actuator means are provided to excite the tube at a point intermediate the inlet and outlet ends, causing the tube to vibrate in a circular path. When fluid flows therethrough, the tube is subjected to Coriolis forces, causing it to torsionally oscillate in accordance with mass flow. A pair of sensors are disposed at respective points between the inlet and outlet ends of the tube and the excitation point to yield in response to the torsional oscillations, sensor signals which are applied to a processing circuit from which a measurement signal is derived that depends on the relative phases of the sensor signals, after averaging several circular vibrations to provide a mass flow readout.

BRIEF DESCRIPTION OF DRAWING

For a better understanding of the invention and of other features thereof, reference is made to the single feature of the drawing which schematically illustrates a Coriolis-type mass flowmeter in accordance with the invention.

DETAILED DESCRIPTION OF INVENTION

Referring now to the figure, a mass flowmeter in accordance with the invention includes a straight measuring tube 2 through which the fluid to be metered is conducted. Flow tube 2 is formed of high-strength flexible material such as stainless steel or other thin-walled tubing non-reactive with the fluid to be metered. Tube 2 is supported coaxially within a straight, rigid support pipe 12 of larger diameter by means of clamps 8 and 12 at opposite ends of the pipe. Clamp 8 engages flow tube 2 at its inlet end 4, while clamp 10 engages the tube at its outlet end 6. The mass of the support pipe is large relative to that of the measuring tube.

At the midpoint between inlet 4 and outlet 6 is an electromagnet actuator formed by electromagnet coils 14 attached to the inner wall of support pipe 12 and cooperating permanent magnets 16 attached to the outer surface of flow tube 2. The actuator serves to excite the tube to vibrate in a circular path, rather than up and down as in the Sipin patent, supra. For this purpose, three permanent magnets 16 are symmetrically disposed in a circumferential array on tube 2, to cooperate with a like array of coils 14 on the inner surface of pipe 12.

A drive generator 7 applies to the three coils 14 of the electromagnetic actuator, three-phase AC currents having a predetermined frequency. These three phase currents cause the excited flow tube 2 to vibrate in a circular path so that during this motion flow tube 2 is no longer coaxial with its support pipe.

Preferably placed midway between inlet end 4 of tube 2 and the actuator excitation midpoint of flow tube 2 is a first electromagnetic sensor composed of a permanent magnet 20 attached to the exterior surface of flow tube 2 and a cooperating pick-up coil 18 attached to the inner surface of support pipe 18. And placed midway between outlet end 6 and the excitation point is a second electromagnet sensor composed of a permanent magnet 24 and a cooperating pick-up coil 22. These sensors are responsive to the movement of the flow tube relative to the stationary support pipes. The invention is not limited to electromagnet sensors and other known types may be used.

Measuring tube 2 which is excited to vibrate in a circular path, is at the same time twisted by Coriolis forces to oscillate torsionally as a function of mass flow. As a consequence, the signals yielded by the sensors which are on either side of the excitation point, are displaced in phase.

In the absence of flow, when the flow tube is vibrating in a circular path, the signals yielded by the sensors are then in phase at the excitation frequency. But when fluid flows through measuring tube 2, the vibrating tube then twists as a result of the torsional oscillations, and the signals then yielded by the sensors are displaced in phase as a function of these oscillations.

The sensors pick up the relative radial amplitude of measuring tube 2 at the points at which they are placed. These signals are applied to a processing circuit 26 to which is also applied a frequency signal from drive generator 7. Processing circuit 26 yields a measuring signal which depends on the differential between the relative phases of the sensor signals to produce a mass flow measurement signal that is applied to a suitable mass flow readout 9.

Transitory or random disturbances from external sources which give rise to vibrations of the meter and produce movement of sensor elements 18-20 and 22-24 relative to the center of the mass of the quiescent measuring tube 2, act to modulate the processed signal that depends on mass flow. Also, disturbances which twist the flow tube or the support pipe act to modulate the processed signal. Such disturbances therefore degrade the accuracy of the mass flow measurement. However, the processing circuit 26, by averaging over several circular vibrations, yields a measurement signal of relative phase corresponding to the mass flow; hence the measurement signal is substantially independent of these disturbances.

It is to be noted that external mechanical vibrations from external sources which affect the measuring tube do not normally have a circular movement, and therefore can be suppressed by the intelligent signal processor 26.

In practice, the exciter elements 14-16 need not be located at the midpoint between the supported inlet and outlet ends 4 and 6 of flow tube 2. Also, it is not necessary that sensors 18-20 and 22-24 be midway between the inlet and outlet ends 4 and 6 and the excitation point. Nor is it essential that the sensors pick up the relative phases at a phase angle of 90 degrees.

The Coriolis effect producing the phase differential at sensors 18-20 and 22-24 is proportional to the rotational speed $V_u$. Since $V_u = W \cdot r$, where W is the angular velocity and r is the amplitude of the circular vibration of measuring tube 2, amplitude r remains constant, and value W, the angular velocity, is measured. And since angular velocity W changes with mass flow, the density of the fluid can also be determined. With a constant amplitude 4 of the circular vibrations, mass flow is then proportional to angular velocity W. Therefore, in the measurement system, the phase differential signal is divided by the measured angular velocity W to yield a value independent of it.

While there has been shown and described a preferred embodiment of a Coriolis-type mass flowmeter having a straight measuring tube in accordance with the invention, it will be appreciated that many changes and modifications may be made therein without, however, departing from the essential spirit thereof.

I claim:

1. A mass flowmeter of the Coriolis type comprising:
   (a) a straight measuring tube fixedly supported at its inlet end and its outlet end, whereby the tube is free to vibrate in a circular path as well as to oscillate torsionally, said tube being supported coaxially within a rigid support pipe provided at its ends with means engaging the inlet end and the outlet end of the tube;
   (b) actuator means responsive to drive currents to excite the tube at an intermediate position thereon to vibrate in a circular path, said tube being caused to twist and oscillate torsionally when fluid to be metered is conducted therethrough, said actuator means being constituted by three permanent magnets in a circumferential array attached to the exterior of the tube and three coils cooperating with the magnets and attached to the interior surface of the pipe;
   (c) a pair of sensors responsive to tube movement, one of the sensors being placed at position between said intermediate position and the inlet end and the other being placed between said intermediate position and the outlet end, whereby said sensors yield signals whose relative phases are displaced as a function of the torsional oscillations; and
   (d) a processing circuit responsive to said sensor signals to produce a mass flow measurement signal that depends on the differential between the relative phases of the sensor signals.

2. A mass flowmeter as set forth in claim 1, wherein said processing circuit averages several circular vibrations to obtain said measurement signal.

3. A mass flowmeter as set forth in claim 1, further including a drive generator to apply three-phase currents to said coils to cause said tube to undergo circular motion.

4. A mass flowmeter as set forth in claim 1, wherein the mass of the pipe is large relative to that of the tube.

5. A mass flowmeter as set forth in claim 1, wherein each sensor is formed by a permanent magnet attached to the exterior of the tube and a pick-up coil attached to the interior wall of the pipe.

6. A mass flowmeter as set forth in claim 1, wherein said intermediate position is midway between the inlet and outlet ends of the tube.

7. A mass flowmeter as set forth in claim 6, wherein one sensor is midway between the intermediate position and the inlet end of the tube and the other sensor is midway between the intermediate position and the outlet end of the tube.

* * * * *